United States Patent Office 3,377,293
Patented Apr. 9, 1968

3,377,293
PRODUCTION OF FLUID COMPOSITIONS
Eric James Shepherd, Pinner, Middlesex, England, assignor to Monsanto Chemicals Limited, London, England, a British company
No Drawing. Continuation-in-part of application Ser. No. 474,513, July 23, 1965. This application Nov. 23, 1966, Ser. No. 596,442
Claims priority, application Great Britain, June 23, 1959, 21,448/59
16 Claims. (Cl. 252—309)

ABSTRACT OF THE DISCLOSURE

The present invention is generally directed to a novel process for the production of a fluid composition containing colloidally dispersed silica, which process comprises the steps of forming a stable, water-in-oil emulsion of a silica aquasol and an organic liquid immiscible with said aquasol, and subsequently evaporating water from said emulsion until sufficient water is removed to transfer the silica particles from the aqueous phase of the emulsion to the organic phase of the resulting fluid composition. The aforementioned silica aquasol is characterized by containing colloidally dispersed silica particles having a particle size in the range of from 5 to 250 millimicrons, and having a pH from about 8.0 to about 11.0. The resultant fluid composition is characterized by having a colloidal dispersion of silica particles within said particles size range in said organic liquid.

---

The subject matter of the present invention was disclosed, in part, in my copending application for Letters Patent, Ser. No. 474,513, filed in the United States Patent Office on July 23, 1965. The application Ser. No. 474,513, in turn, is a continuation of my application Ser. No. 37,109 filed in the United States Patent Office on June 20, 1960 now abandoned. The present application should be considered in conjunction with said applications Ser. No. 474,513 and Ser. No. 37,109 and considered as a continuation-in-part of application Ser. No. 474,513.

This invention relates to the production of fluid compositions containing colloidally dispersed silica, and to their use in, for example, the treatment of textiles.

Liquids containing colloidally dispersed silica have many uses, such as for example in paints, in printing inks, in lubricating compositions, and in textile oils. For example oils containing collidal silica are valuable in textile operations to reduce slippage between the fibres.

A particularly effective way of producing a fluid composition (that is to say a composition which is pourable) containing colloidally dispersed silica has now been found.

It is, accordingly, one object of this invention to provide a novel process of producing a colloidal dispersion of silica in an organic liquid which is immiscible with a silica aquasol.

It is a further object of this invention to provide a fluid colloidal dispersion of silica in an organic liquid which is immiscible with a silica aquasol, which dispersion is suitable, for example, for the treatment of textiles or as an additive in paints, varnishes or other coating compositions.

The process of the invention is one for the production of a fluid composition containing colloidally dispersed silica, in which water is removed by evaporation from an emulsion of a silica aquasol and an organic liquid immiscible with the aquasol so as to produce a colloidal dispersion of silica in the liquid.

By the process of the invention fluid compositions can be produced which whilst still capable of being poured contain a greater percentage of dispersed silica than previous pourable compositions. The invention does in fact include a fluid composition that is an organic liquid containing 25% or more by weight of colloidally dispersed silica.

The organic liquid immiscible with the silica aquasol is defined as a liquid which when mixed with the aquasol results in the formation of two liquid phases, and in practice it is also of course a liquid in which it is useful to obtain a dispersion of silica. Normally it is an organic liquid that can be emulsfied with the aquasol to form a stable emulsion from which the water of the sol can be evaporated by the application of heat to leave the silica remaining in the organic liquid.

By the process of the invention silica can be dispersed in a very large variety of organic liquids immiscible with silica aquasols, including water-immiscible organic liquids. If the products are to be used in the textile industry then in general there will be employed as such organic liquids the textile oils which are normally used in the textile industry, for example in spinning operations. Thus there can be employed water-immiscible mineral oils, for example spindle oils; vegetable oils, for example oleine, arachis oil, castor oil, olive oil, and other glycerides; oils of animal origin such as for instance sperm oil; and blends of any of these types of oil, for instance blends of sperm oil and caster oil, or of oleine and mineral oil. In woolen spinning for example oleine and oleine-mineral oil blends are very useful, as are olive oil and sperm oil/castor oil blends in worsted spinning. In some instances a textile oil is sold in a form which already contains an essentially oil-soluble emulsifying agent, and such an oil is known as a self-scouring textile oil; the emulsifying agent is normally of the nonionic type but sometimes there is in addition a small proportion of an anionic emulsifying agent.

There are many other water-immiscible organic liquids or organic liquids immiscible with silica aquasols in which colloidal dispersions of silica can be produced by the process of the invention. These organic liquids can for instance be oils used in paints and varnishes such as for example linseed oil, stand oil, tung oil, soyabean oil; lubricating oils; solvents of various types, for instance esters such as for instance butyl or amyl acetate, aromatic hydrocarbons such as for instance toluene and xylene, aliphatic hydrocarbons such as for instance white spirit and solvent naphtha, and ketones such as for instance methyl isobutyl ketone; and dry-cleaning solvents such as for instance trichlorethylene and perchlorethylene. As well as the appropriate oils many of the solvents find application in the formulation of paints and varnishes, where the presence of silica modifies the surface properties.

Irrespective of the organic liquid used, it is desirable to employ an organic liquid which has a boiling point above, preferably at least 50° C. above, that of water at any comparable pressure in the range of 1–760 mm. of mercury.

Fluid compositions containing from 1 to 2% of silica to 8 or 10% can easily be obtained. However, it is also practical to make fluid compositions containing considerably higher amounts of silica, such as from 10 or 15% up to 20 or 25% and more. Stable fluid compositions containing more than 30% and even up to 40% by weight of silica have for example been prepared by the process of the invention. Fluid compositions containing from about 1 to 30% by weight of silica are particularly desirable for most uses. The more concentrated compositions can of course be diluted before final use. Useful particle sizes for the silica in these fluid compositions range for instance from 5 to 250 millimicrons (diameter), preferably, for example from 10 to 100 millimicrons.

A particularly suitable class of silica aquasols which can be used with the organic liquids, immiscible therewith, in the processes of this invention are those silica aquasols which are stable; that is, do not gel on standing for at least one year at 30° C. at a silica concentration of say about 20 to about 30% by weight; have a silica (SiO$_2$) to M$_2$O (where M is an alkali metal) weight ratio of about 40:1 to about 500:1, preferably in the range of about 70:1 to about 250:1, have a pH in the range of about 8 to about 11, preferably in the range of about 8.5 to about 10.5 (the aquasol pH range between 8.0 and 11.0 or 8.5 and 10.5 is merely that pH which is produced by having a SiO$_2$ to M$_2$O weight ratio, respectively, of 40:1 to 500:1 or 70:1 to 250:1); and contain less than 1.5% by weight of inorganic salts, for example, MCl or M$_2$SO$_4$ (here M is an alkali metal), or other salts, preferably less than 1% by weight of salts, and more desirably less than 0.3% by weight of salts.

The silica aquasol employed in the process can for instance be one of the silica sols sold under the names "Syton" 2X, "Syton" W.20, "Ludox" HS and "Ludox" LS ("Syton" and "Ludox" are registered trade marks), but other suitable aquasols can be used if desired. Suitable silica aquasols can be obtained in various ways well known in the art; for example by treating a solution of sodium silicate with an ion exchange material, or by acidifying a sodium silicate solution and subjecting the acidified silicate to treatment with alcohol in order to remove the electrolyte material, after which the resulting sol is made slightly alkaline and the alcohol is evaporated from the sol. Silica aquasols containing up to perhaps 50% by weight of silica are useful, and the size of the dispersed silica particles can vary widely depending on the effect which it is desired to achieve; sols containing particles of a size ranging from for instance 5 to 250 millimicrons, and particularly from 10 to 100 millimicrons, give good results.

The concentration and the type of the silica aquasol employed in the process depend in practice upon the percentage of silica required in the final fluid composition and the required particle size. Silica aquasols are often available containing 15% or 30% by weight of silica (although sols containing higher percentages of silica such as for instance 50% can be obtained and their use has advantages in some cases), and by a choice of the appropriate quantity to emulsify with the organic liquid there can readily be produced fluid compositions of the required silica content. In general it is preferable to use a volume of the silica sol which is smaller than the volume of the organic liquid, and where the more concentrated fluid compositions are to be produced it is desirable to employ a silica aquasol containing at least 20% by weight of silica.

The emulsion of the silica aquasol and the organic liquid is preferably obtained by mixing the aquasol with good agitation with the organic liquid containing an emulsifying agent, which needs to be essentially of the oil-soluble type; preferably, as has been stated, the volume of the sol is less than that of the organic liquid. These conditions are conducive to the formation of a stable water-in-oil emulsion, which is very often the type of emulsion formed in the first instance. In any event a water-in-oil emulsion is normally the kind of emulsion present in the later stages of the evaporation. In general, additional stability can if desired be imparted to an emulsion as first prepared by agitating it in for instance a homogeniser.

In the initial emulsion which is formed, the colloidal silica is present in the water phase of the emulsion, that is, the water phase of the silica aquasol. This is probably due to the fact that the colloidal silica in the silica aquasol is hydrophilic and not organophilic, and only becomes organophilic during or after the removal of water from the emulsion by evaporation, but of course, it is not intended to limit the invention by any theory.

Emulsifying agents that are particularly useful are suitable nonionic materials, but in certain instances there can also be used oil-soluble anionic materials such as for example oil-soluble soaps and petroleum sulphonates. Nonionic agents that can be employed include appropriate organic esters as well as the appropriate condensation products of ethylene oxide with an organic compound having preferably one or two reactive hydrogens, for example, a carboxylic acid (examples are given below), an alcohol (for instance cetyl or lauryl alcohol), a phenol (for instance butylphenol or octylphenol), an amine or a mercaptan. The condensation products of the ethylene oxide/carboxylic acid type are often produced by other means, for instance by esterifying a polyethylene glycol [by which is meant a poly(ethyleneglycol) or polyoxyethylene glycol] with a carboxylic acid. Specific emulsifying agents of the organic ester type that give excellent results are di- and polyethylene glycol esters of long-chain aliphatic carboxylic acids (the aliphatic group may be unsaturated). Polyethylene glycol monoesters and diesters of long-chain alkyl carboxylic acids are particularly suitable, and those derived from polyethylene glycols having a molecular weight within the range of from 150 to 900 (that is, from 3 to 20 ethenoxy groups) are especially valuable. Suitable esterifying groups are those derived from alkyl carboxylic acids having from 10 to 20 carbon atoms in the molecule, for instance lauric, stearic, oleic and palmitic acids. Examples of diesters which have given excellent results are the dioleate of a polyethylene glycol of molecular weight 600 (that sold under the name "Nonex 69"), the distearate of a polyethylene glycol of molecular weight 400 (that sold under the name "Nonex 76") and the dilaurate of a polyethylene glycol of molecular weight 300 (that sold under the name "Nonex 102"). Monoesters that are useful in some instances include the mono-oleates of polyethylene glycols of molecular weight 200, 300, 400 and 600 respectively; and the monolaurates and the monostearates of these polyethylene glycols. Propylene glycol and glyceryl esters of long-chain alkyl carboxylic acids; condensates of sorbitan with fatty acids (especially the substance known as sorbitan sesquioleate); and lanoline (which is a mixture of cholesteryl palmitate, oleate and stearate), can also be used.

Sufficient of the emulsifying agent is preferably employed to form a stable emulsion, and from 1.5 to 10% of emulsifying agent, for instance 2 to 5%, by weight of the organic liquid is usually suitable. Larger amounts, up to 20% or even 30% by weight, can advantageously be used if the composition to be prepared is a concentrated one containing for instance more than about 20% by weight of silica.

The water of the silica sol can be evaporated from the emulsion in various ways, but it is convenient to do this by heating the emulsion at a pressure lower than atmospheric pressure, for example, at pressures of about 1 to about 600 mm. of mercury, preferably at pressures of about 2 to about 200 mm. of mercury, and more desirably at pressures of 5 to 100 mm. of mercury. In general it is preferable to maintain the temperature below about 80° C. to 85° C., for instance between 40° C. and 75° C., and excellent results are obtained at between 50° C. and 60° C. Of course a temperature lower than 40° C. can be employed, for instance 30° C. It is often desirable to stir the emulsion whilst the evaporation is being carried out, particularly where a composition of high silica content is being prepared. After the water has been completely evaporated from the emulsion of silica aquasol and organic liquid, the organic liquid contains the silica (which was originally present in the aquasol), colloidally dispersed therein, that is, colloidally dispersed in the organic liquid.

It is believed that sometime during the course of evaporation of water from the emulsion that part of the colloidal silica transfers or moves from the aqueous or water phase of the emulsion to the organic liquid phase, but the fact that this takes place or the amount of silica which transfers to the organic liquid prior to the evaporation of all of the water has not been fully established. Regardless of any theory involved, however, the fact remains that by carrying out the process of this invention the colloidal silica is transferred from the aqueous or water phase of the silica aquasol into the organic liquid phase of the organic liquid which is immiscible with the aquasol. Moreover, the alkali (expressed as $M_2O$, where M is an alkali metal) associated with the silica in the preferred starting silica aquasols, also is transferred from the aquasols to the organic liquid so that the $SiO_2$ to $M_2O$ weight ratio of the fluid silica compositions obtained by carrying out the processes of this invention is essentially the same as that of the starting silica aquasol from which such compositions are prepared. Thus, if a fluid composition of essentially the organic liquid with silica colloidally dispersed therein is prepared according to the processes described herein from a silica aquasol having a silica to $Na_2O$ weight ratio of about 100:1, such fluid composition generally will also have essentially a silica to $Na_2O$ weight ratio of about 100:1.

The process of the invention can be used to produce fluid compositions based on textile oils which are suitable for use in the treatment of many textiles where finely-divided silica gives an improvement in the textiles' properties or assists processing, particularly fluid compositions for use in the spinning of wool and wool blends by the woolen and worsted systems of spinning. Examples of suitable wool blends are blends of wool with Terylene, Acrilan, nylon, and viscose rayon respectively. (The words "Terylene" and "Acrilan" are registered trademarks.) The fluid compositions are usually applied to unspun fibres before spinning. The silica content can range from say 2 to 10% by weight of the textile oil, and is preferably from 3 to 8%, for instance about 6% by weight. Suitable fluid compositions can be made by first intent or by dilution with more textile oil of a more concentrated composition.

When used in textile processing the appropriate concentrated compositions can if desired be diluted and emulsified with water, and in these circumstances they can usefully contain an emulsifying agent that aids the formation of an oil-in-water emulsion (for instance a nonionic agent or an anionic agent, such as a soap, which is soluble to some degree in water) as well as the oil-soluble and preferably nonionic emulsifying agent that will normally be present as described above.

The invention is illustrated by the following examples.

Example 1

This example describes the production of fluid compositions based on a mineral textile oil by the process of the invention.

1.5 grams of a stable silica aquasol containing 30% by weight of silica having a particle size of about 25 millimicrons, a pH of 9 to 10, a silica to $Na_2O$ weight ratio of about 100:1 and containing less than 0.1% by weight of a salt, were stirred into 7 grams of a light mineral oil containing 0.21 gram of the dioleate of a polyoxyethylene glycol of molecular weight 600 (Nonex 69), to form a stable emulsion. The water was then distilled off at 40° C. under reduced pressure, that is, an absolute pressure of 20 millimeters of mercury.

The resulting fluid composition was clear and mobile and consisted of a stable dispersion of 6% by weight of silica in the oil and a silica to $Na_2O$ weight ratio of about 100:1; it was suitable for use in the treatment of textiles.

Another fluid composition was prepared in a similar manner from 3 grams of an identical silica aquasol and 7 grams of the light mineral oil. The product obtained in this way contained 12% by weight of silica, but was still stable and sufficiently fluid to be easily poured. It actually had a viscosity of 195 centipoises at 20° C. compared with 74 centipoises for the light mineral oil alone.

Example 2

This example describes the preparation of fluid compositions based on oleine by the process of the invention.

1.5 grams of the same silica aquasol as used in Example 1 was stirred into 7 grams of 50's oleine (that is to say, a mixture containing 50% by weight of oleine and 50% of a light mineral oil) containing 0.21 gram of the dioleate of a polyethylene glycol of molecular weight 600 (Nonex 69) to form a stable emulsion. The water was then distilled off at 30° C. under reduced pressure, that is, an absolute pressure of 15 millimeters of mercury.

The resulting fluid composition was a clear stable dispersion of 6% by weight of silica in the 50's oleine, and was very suitable for use in the treatment of textiles.

The above procedure was repeated using 70's and 98's oleines respectively (that is to say mixtures of 70% and 98% by weight respectively of oleine with the light mineral oil) in place of the 50's oleine. In these two instances however the emulsions formed were stirred whilst the water was distilled off at 30° C. The resulting fluid compositions were in each instance relatively mobile liquids valuable in the treatment of textiles.

Example 3

This example described the preparation of a fluid composition based on a mineral textile oil and containing 21% by weight of colloidally dispersed silica.

7 grams of the same silica aquasol as was employed in Example 1 and containing 30% by weight of silica were added with efficient stirring to 7 grams of a light mineral oil containing 1.2 grams of the distearate of a polyethylene glycol of molecular weight 400. A stable emulsion was formed. The water was then distilled from the emulsion with stirring at 50° C. under reduced pressure, that is, an absolute pressure between 20 and 30 millimeters of mercury.

The resulting clear fluid composition was still relatively mobile and contained 21% by weight of silica. It was suitable for dilution with additional quantities of a textile oil to give a composition ready for the treatment of textiles.

Example 4

This example describes the preparation of a fluid composition based on oleine, a textile oil.

6 grams of a stable silica aquasol containing 15% by weight of silica, a pH of about 9 to 10, a silica to $Na_2O$ weight ratio of about 90.1 and containing less than 0.1% by weight of a salt, were added with good stirring to 14 grams of oleine containing 0.35 grams of lanolin to form an emulsion. This was further stabilized by passing it through a homogeniser, and the water was then distilled off at 60° C. under reduced pressure, that is, an absolute pressure between 30 and 40 millimeters of mercury.

The resulting fluid composition was clear stable dispersion of 6% by weight of silica in the oleine.

Example 5

This example describes the production of a fluid composition consisting of 30% by weight of silica dispersed in a self-scouring textile oil.

17.2 grams of a silica aquasol containing 50% by weight of silica, a pH of about 10.5, a silica to $Na_2O$ weight ratio of about 90:1 and containing less than 0.1% by weight of a salt, were added with good stirring to 20 grams of a self-scouring textile oil (that is a light mineral oil containing 4 grams of a condensation product of 4 mols of ethylene oxide with 1 mol of octylphenol, and a small quantity of water). A stable emulsion was formed and water was distilled off from this, with stirring, at between 40° C. and 70° C. under reduced pressure, that is, an absolute pressure between 20 and 50 millimeters of mercury.

The resulting fluid composition was a clear stable dispersion of 30% by weight of silica in the oil; it could be diluted with a textile oil to give a composition ready for application for textiles.

Example 6

This example describes the production of fluid compositions based on a mineral textile oil in which there is used a nonionic emulsifying agent containing a small quantity of an anionic agent.

The procedures described in Example 1 were repeated, except that the quantities of the Nonex 69 were replaced by a mixture of two parts of Nonex 69 with one part of a sulphonated petroleum oil.

In each instance a stable dispersion of silica in the mineral oil was obtained.

Example 7

This example describes the treatment of wool with a fluid composition comprising silica dispersion in oleine.

20 pounds of 60/64's wool were spread out in a layer, and 2 pounds of a fluid composition comprising 6% by weight of silica dispersed in 70's oleine (the composition prepared by the method described in Example 2) were applied by means of a lecking can. The oiled wool was then passed through a fearnought before carding on a Saxony card. The card production was 12 yards per minute with a slabbing of 14's card count. The yarn produced was approximately 20's Yorkshire Woollen Skein (mule spun) with medium twist.

For the purpose of comparison, another 20 pounds sample of the same wool was similarly treated and spun, but 2 pounds of 70's oleine were used instead of the silica-oleine dispersion.

Tensile strength tests were carried out on representative yarn samples taken from each spinning, and the yarn was analysed for silica and oil.

The strength given is the force in pounds weight required to break a loop of the yarn formed by winding one seventh of a Yorkshire skein (that is, 36.3 yards) into a loop 1 yard in circumference. The Yorkshire Woollen Skein Count (that is the weight in pounds of one Yorkshire skein, 256 yards, of the yarn), was multiplied by the strength in each case, in order to eliminate the effects of minor variations in count, and the product was taken as a measure of the strength of the wool itself.

The results of the tests are set out in the table below.

| | Wool treated with— | |
|---|---|---|
| | Oleine alone | Oleine + silica |
| Percent oleine in wool | 6.7 | 7.5 |
| Percent silica in wool | | 0.39 |
| Twist (turns per inch) | 11 | 11 |
| Strength (pounds) | 37.2 | 44.2 |
| Yorkshire Woollen Skein Count | 18.1 | 17.4 |
| Count X strength | 666 | 767 |

It can be seen that the yarn obtained from wool treated with the oleine silica dispersion was much stronger than that obtained from wool treated with oleine alone, and in fact the difference in strength amounted to an increase of 15.2%.

Example 8

This example describes the production of a fluid composition based on a linseed stand oil by the process of the invention.

83.3 grams of a silica aquasol, identical with that used in Example 1, containing 30% by weight of silica having a particle size of 25 millimicrons, were stirred vigorously into 96 grams of linseed stand oil of viscosity 60 poises at 20° C. containing 4 grams of propyleneglycol mono-oleate to form a stable emulsion. The water was then distilled off at 50° C. under reduced pressure, that is, at an absolute pressure between 20 and 30 millimeters of mercury.

The resulting fluid composition was of similar viscosity to the original linseed stand oil, and consisted of a clear stable dispersion of 20% by weight of silica in the oil; it was suitable for use in the formulation of paints and varnishes.

Example 9

This example describes the production of a fluid composition based on soyabean oil by the process of the invention.

27 grams of a stable silica aquasol containing 30% by weight of silica having a particle size of 100 millimicrons, a pH of 9 to 10, a silica to $Na_2O$ weight ratio of about 90:1 and containing less than 0.1% by weight of a salt, were added with efficient stirring to 86 grams of soyabean oil containing 10 grams of a mixture of fatty acids (made by hydrolysing the same soyabean oil) and 4 grams of the dilaurate of a polyethylene glycol of molecular weight 300 to form a stable emulsion. The water was then distilled off at 50° C. under reduced pressure, that is, at an absolute pressure between 20 and 30 millimeters of mercury.

The resulting composition had a viscosity of about 50 centipoises at 20° C. (about the same as that of the original soyabean oil) and consisted of a clear stable dispersion of 7.5% by weight of silica in the oil.

Example 10

This example describes the production of a fluid composition based on white spirit and containing dispersed silica.

5.4 grams of the same silica aquasol as was employed in Example 5 and containing 50% by weight of silica were added with good stirring to 37.5 grams of white spirit (a petroleum fraction having a boiling range between 150° C. and 190° C.) containing 4.5 grams of the mono-oleate of a polyethylene glycol of molecular weight 300. A stable emulsion was formed and the water was then distilled off at 40–50° C. under reduced pressure, using a short distillation column, the pressure used being between 20 and 30 millimeters of mercury.

The resulting fluid composition consisted of a clear stable dispersion of about 6% by weight of silica in the white spirit.

Example 11

The procedure of the previous example was repeated using 37.5 grams of perchlorethylene in place of the white spirit to give a similar dispersion of silica in the perchlorethylene.

What is claimed is:

1. A process for the production of a fluid composition containing colloidally dispersed silica which comprises the step of forming a stable, water-in-oil emulsion of (a) a silica aquasol containing colloidally dispersed silica particles having a particle size in the range of from 5 to 250 millimicrons, said aquasol being further characterized by having a pH from about 8.0 to 11.0, and (b) an organic liquid immiscible with said silica sol, and subsequently evaporating water from said emulsion until sufficient water is removed to form a colloidal dispersion of silica particles within said particle size range in said organic liquid.

2. A process according to claim 1, in which said emulsion is initially prepared with the aid of a nonionic, oil-soluble emulsifying agent.

3. A process according to claim 2, in which said emulsifying agent is an oil-soluble condensation product of ethylene oxide and a substance selected from the group consisting of a carboxylic acid having one reactive hydrogen atom, an alcohol, a phenol, an amine and a mercaptan.

4. A process according to claim 2, in which said emulsifying agent is an oil-soluble organic ester.

5. A process according to claim 4, in which said ester is a polyethylene glycol ester of an aliphatic carboxylic acid.

6. A process according to claim 4, in which said ester has a molecular weight within the range of 150 to 900 and is a polyethylene glycol diester of an alkyl carboxylic acid having from 10 to 20 carbon atoms in the molecule.

7. A process according to claim 6, in which said carboxylic acid is oleic acid.

8. A process according to claim 2, in which said emulsifying agent is lanolin.

9. A process for the production of a fluid composition containing colloidally dispersed silica which comprises the step of forming a stable, water-in-oil emulsion of (a) a silica aquasol containing colloidally dispersed silica particles of a particle size in the range of from 10 to 100 millimicrons, said aquasol being further characterized by having a pH from about 8.5 to about 10.5, (b) an oil-soluble emulsifying agent, and (c) an organic liquid immiscible in said aquasol, and subsequently evaporating water from said emulsion at a pressure below atmospheric pressure until sufficient water is evaporated to form a colloidal dispersion of silica particles of said particle size range in said organic liquid.

10. A process for the production of a fluid composition containing colloidally dispersed silica which comprises evaporating water from water-in-oil emulsion of (a) an alkaline silica aquasol having an $SiO_2$ to $M_2O$ weight ratio, where M is an alkali metal, in the range of about 70:1 to about 250:1 and containing colloidally dispersed silica particles of particle sizes of from 10 to 100 millimicrons, said aquasol being further characterized by having a pH from about 8.5 to about 10.5, (b) an oil-soluble emulsifying agent, and (c) an organic liquid immiscible with said aquasol, and subsequently evaporating water from said emulsion at a temperature in the range of from about 50 to 75° C. and at an absolute pressure of about 2 to about 200 millimeters of mercury until substantially all of the water in said emulsion is evaporated to form a colloidal dispersion of silica particles of said particle size range in said organic liquid.

11. A process according to claim 10, in which said aquasol contains at least 15% by weight of silica and the volume of aquasol in said emulsion is less than the volume of said organic liquid.

12. A process according to claim 11, in which from 1.5 to 30% by weight, based on the weight of said organic liquid, of said emulsifying agent is present in said emulsion.

13. A process according to claim 10, in which said organic liquid is a textile treating oil.

14. A process according to claim 13, in which said textile treating oil is selected from the group consisting of oleine, arachis oil, castor oil, olive oil, sperm oil, a mineral oil and mixture thereof.

15. A process according to claim 10, in which said organic liquid is soybean oil.

16. A process according to claim 10, in which said organic liquid is white spirit.

References Cited

UNITED STATES PATENTS

| | | | |
|---|---|---|---|
| 2,375,738 | 5/1945 | White | 252—309 |
| 2,377,841 | 6/1945 | Marshall | 252—313 |
| 2,408,654 | 10/1946 | Kirk | 252—309 |
| 2,433,779 | 12/1947 | Marshall | 252—309 |
| 2,910,374 | 10/1959 | Simko et al. | 106—285 |
| 2,921,913 | 1/1960 | Alexander | 252—309 |
| 3,016,304 | 1/1962 | Preston et al. | 106—287 |
| 3,065,173 | 11/1962 | Blake et al. | 252—309 |

FOREIGN PATENTS

| | | |
|---|---|---|
| 957,592 | 2/1957 | Germany. |
| 654,858 | 7/1951 | Great Britain. |

ALEXANDER H. BRODMERKEL, *Primary Examiner.*

J. B. EVANS, *Assistant Examiner.*